United States Patent [19]
Krikken

[11] Patent Number: 5,972,119
[45] Date of Patent: Oct. 26, 1999

[54] PROCESS AND SYSTEM FOR OBTAINING STARCH AND PROTEINS FROM THE FLOUR OF LEGUMES, IN PARTICULAR PEAS

[75] Inventor: Jan Krikken, Wildervank, Netherlands

[73] Assignee: Flottweg GmbH, Vilsbiburg, Germany

[21] Appl. No.: 09/068,357

[22] PCT Filed: Nov. 2, 1995

[86] PCT No.: PCT/EP96/04766

§ 371 Date: May 7, 1998

§ 102(e) Date: May 7, 1998

[87] PCT Pub. No.: WO97/17376

PCT Pub. Date: May 15, 1997

[30] Foreign Application Priority Data

Nov. 2, 1995 [DE] Germany .......................... 195 42 030

[51] Int. Cl.⁶ ............................................... C08B 30/04
[52] U.S. Cl. .............................. 127/27; 127/24; 127/68; 530/370
[58] Field of Search ............................... 127/24, 27, 68; 530/370

[56] References Cited

U.S. PATENT DOCUMENTS

| | | | |
|---|---|---|---|
| 3,713,297 | 1/1973 | Shaw ........................................ | 127/66 |
| 3,813,297 | 5/1974 | Shaw . | |
| 4,494,530 | 1/1985 | Jansma et al. ............................. | 127/69 |
| 4,766,204 | 8/1988 | Nickel .................................... | 530/378 |
| 5,034,227 | 7/1991 | Nickel .................................. | 424/195.1 |

FOREIGN PATENT DOCUMENTS

| | | |
|---|---|---|
| 43 01 587 A1 | 7/1974 | Germany . |
| 29 22 247 | 12/1979 | Germany . |
| 275 609 A1 | 10/1990 | Germany . |

OTHER PUBLICATIONS

Abstract Bulletin of the Institute of Paper Chemistry, vol. 36, No. 2, (Aug. 1, 1965,) Appleton US, p. 170 XP002025157, Zajac P. et al.: "The akaline method for the preparation of wheat starch".

Primary Examiner—David Brunsman
Attorney, Agent, or Firm—Henry M. Feiereisen

[57] ABSTRACT

In order to obtain starch and proteins from the flour of legumes, in particular peas, the legume flour which has been treated with an aqueous decomposing agent, is fed into a first section (I) of a process line with several solids-liquids separation stages (6, 9, 10) for the purpose of extracting the proteins. The solid phase suspended in water from the final solids-liquids separation stage (10) of the first section (I) is then fed continually into a second section (II) of the process line with at least one separation stage (11) for separating the fibers from the starch and at least one solids-liquids separation stage for separating the starch from the liquid phase. The aqueous decomposing agent is formed from an alkaline concentrate (B) and the liquid phase separated by the starch in the second section of the process line. The alkaline concentrate (B) and the liquid phase separated by the starch in the second section (II) of the process line are fed into the first section (I) of the process line between the first and last solids-liquids separation stage (6 and 10, respectively). The liquid phase separated by the corresponding downstream solids-liquids separation stage (9, 10) of the first section (I) is fed back against the flow to suspend the solids phase fed into the upstream solids-liquids separation stage (6, 9). The liquid phase (6) separated by the first solids-liquids separation stage (6) of the first section (I) is drawn off from the process line for the purpose of separating the proteins.

32 Claims, 1 Drawing Sheet

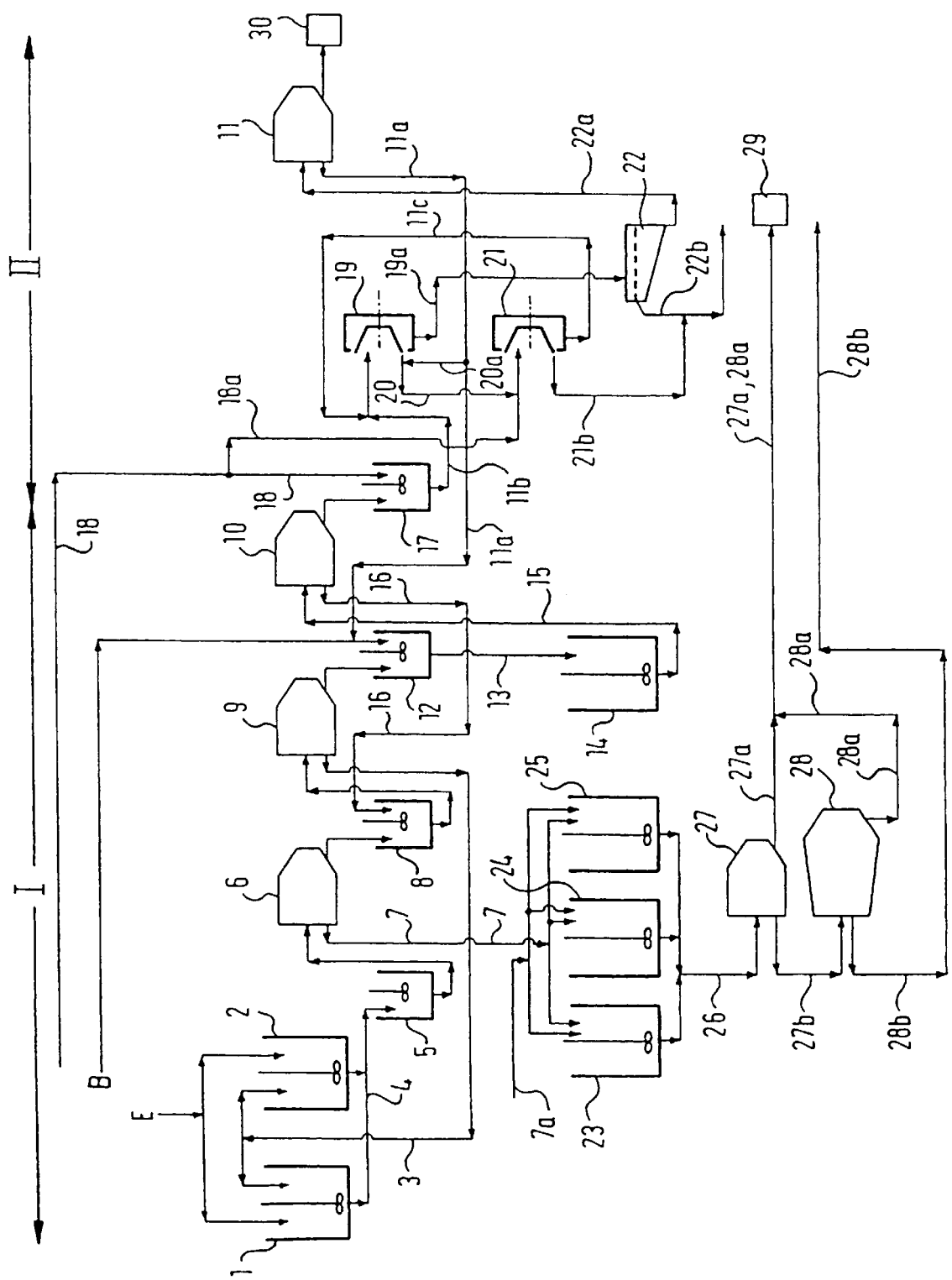

PROCESS AND SYSTEM FOR OBTAINING STARCH AND PROTEINS FROM THE FLOUR OF LEGUMES, IN PARTICULAR PEAS

BACKGROUND OF THE INVENTION

The invention relates to a process for obtaining starch and proteins from the flour of legumes, in particular peas, and to an arrangement for carrying out the process.

The starch of legumes (leguminous plants), in particular of peas, more particularly of wrinkled peas, contains a substantial amount of amylose. Due to the high amylose contents, the starch obtained from the peas has thermoplastic properties and can therefore be processed into form pieces using conventional plastic manufacturing processes. Peas with a higher contents of amylose also have a higher proportion of valuable proteins. A process for obtaining starch and proteins from the flour of legumes is known from the article by Gabriel-Blanke et al., "Production of starch from peas at an industrial scale", published by the Federal Secretary for Food, Agriculture and Forestry, Series A, No. 380, pages 239 to 247, 1990, and from DE 43 01 586 C2. In this conventional process, the legume flour is pulped with an aqueous decomposing agent and continuously fed to a first section of a process line including a plurality of solids-liquids separation stages for extracting the proteins. Subsequently, the solids phase exiting the last solids-liquids separation stage of the first section is suspended in water and continuously fed to a second section of the process line which includes at least one solids-liquids separation stage for separating fibers from starch, and at least one solids-liquids separation stage for separating the starch from the liquid phase. The pea flour is here decomposed with a fivefold quantity of a relatively highly concentrated soda lye and separated in a decanter. The solids phase of the decanter is subsequently suspended again in the fivefold quantity of the highly concentrated soda lye and then again fed to a decanter. The solids phase of the second decanter is suspended in water and the suspension is fed to a screen and to a fine jet screen to separate the fibers.

The liquid phase of the first and the second decanter which contain the proteins, can be combined to obtain the protein. However, the protein in the relatively strong concentrated lye is highly diluted. It is therefore very expensive to obtain the proteins with the conventional processes. The conventional processes also require a relatively large amount of lye and water which increases disposal costs.

SUMMARY OF THE INVENTION

It is the object of the invention to provide a cost-effective process and system with a high yield for obtaining starch of high purity as well as proteins from legumes, in particular from peas.

The object is solved in accordance with the present invention by forming the aqueous decomposing agent from an alkaline concentrate and the liquid phase which is separated by the starch in the second section of the process line, whereby the alkaline concentrate and the liquid phase which is separated by the starch in the second section of the process line, is fed to the first section of the process line between the first and the last solids-liquids separation stage, wherein the liquid phase which is separated in the respective following solids-liquids separation stage of the first section, is fed back in counterflow direction for suspending the solids phase which is fed to the preceding solids-liquids separation stage, and wherein the liquid phase which is separated in the first solids-liquids separation stage of the first section is drawn off the process line for separating the proteins. An arrangement for obtaining starch and proteins from the flour of legumes includes a device for pulping the legume flour with an aqueous decomposing agent, a process line comprising a first section with a plurality of solids-liquids separation stages for extracting the proteins, a container for suspending the solids phase of the last solids-liquids separation stage of the first section in water, a second section of the process line with at least one solids-liquids separation stage for separating the fibers from the starch and at least one solids-liquids separation stage for separating the starch from the liquid phase, a line for feeding an alkaline concentrate and a line for feeding the liquid phase which is separated in the second section of the process line from the starch, to the first section between the first solids-liquids separation stage and the last solids-liquids separation stage, lines for respectively feeding back the liquid phase separated by the respective following solids-liquids separation stage to the associated container in which the solids phase which is fed to the preceding solids-liquids separation stage, is suspended, and a line for drawing off the protein-containing liquid phase of the first solids-liquids separation stage of the first section. Advantageous embodiments of the process of the invention and of the arrangement of the invention are described in the dependent claims.

Peas and other legumes contain starch, proteins and fibers (cell walls, shells) as well as soluble components, such as sugar and minerals.

The proteins are extracted from the pea flour with the aqueous solvent. For this purpose, the flour is pulped with the aqueous solvent and subsequently fed to the first section of a process line which includes several solids-liquids separation stages. The solids phase which is separated out between the solids-liquids separation stages, is fed to a respective container in which the solids phase is again suspended in the aqueous solvent. The solids phase separated in the last solids-liquids separation stage of the first section of the process line is fed to a container in which the separated solids phase is suspended in water. This suspension is then fed to the second section of the process line for separating the fibers from the starch. To separate the starch from the liquid phase, after the proteins and the fibers have been removed from the starch, the end of the second section includes at least one solids-liquids separation stage.

According to the invention, the aqueous decomposing agent is formed from an alkaline concentrate, which is mixed with the liquid phase of the solids-liquids separation stage of the second section of the process line. The so formed aqueous decomposing agent is then fed to the first section of the process line between the first and the last solids-liquids separation stage of the process line.

The aqueous decomposing agent is fed back against the flow by the solids-liquids separation stages of the first section to the container in which the pulp is produced from the pea flour which is fed to the first solids-liquids separation stage of the first section.

For this purpose, the liquid phase which was separated by the respective following solids-liquids separation stage of the first section, is returned to the solids phase of the preceding solids-liquids separation stage to form a suspension. The liquid phase which is separated in the second solids-liquids separation stage of the first section, is returned to form a suspension, i.e. to pulp the pea flour, wherein the pea flour is fed to the preceding, i.e. the first solids-liquids separation stage. The proteins are here concentrated in the liquid phase of the first solids-liquids separation stage of the first section. By feeding the liquid phase of the first solids-liquids separation stage of the first section into an ancillary process line, the proteins can be produced cost-effectively and with a high yield.

Simultaneously, by feeding the aqueous decomposing agent from the first section of the process line back against the flow and by using the liquid phase from the solids-liquids separation stage of the second section of the process line to prepare the aqueous decomposing agent, the starch so obtained has an extremely low protein contents and requires only a small quantities of alkaline concentrate.

The peas or other legumes are preferably ground in dry form to separate the shells. The particle size of the flour is preferably less than 200 micrometer. Although the cell structures are broken up completely when the legumes are very finely ground, finely ground fiber can disadvantageously still reach the final starch product.

The legumes flour is pulped with the aqueous decomposing agent preferably no longer than two hours, more preferably no longer than one hour. Otherwise, the soluble proteins can be converted into insoluble products which can contaminate the produced starch and reduce the protein yield.

Several containers, for example two containers, are used for sequentially pulping the flour. While the pea flour is pulped in one container, the pulp of the other container is fed to the first solids-liquids separation stage of the first section of the process line. During this time, i.e. after the pulp is discharged and before the next pulp is prepared in the container, the other container can also be cleaned, for example rinsed with water.

To pulp the flour, 2 to 4 parts by weight, preferably about 3 parts by weight of the aqueous decomposing agent are mixed with one part by weight pea flour. This produces the relatively high concentration of pea flour in the pulp. The temperature of the pulp is preferably 25 to 35° C.

To improve the process dynamics, a buffer container for receiving the pulp is provided between the pulping containers and the first solids-liquids separation stage of the first section of the process line.

The aqueous decomposing agent formed from the alkaline concentrate and from the liquid phase separated from the starch in the second section is fed to the first section of the process line, preferably between the next to the last and the last solids-liquids separation stage, i.e. to the container in which the solid matter which was separated in the next to the last solids-liquids separation stage, is suspended. If the first section consists, for example, of three solids-liquids separation stages, then the aqueous decomposing agent of the process line is fed via the container in which the solid matter which is separated by the second solids-liquids separation stage, is suspended.

The alkaline concentrate is preferably sodium hydroxide. However, any other alkaline solution can be used, as well as an amine or a salt from a strong base and a weak acid. However, the alkaline concentrate should have a sufficiently high alkalinity so that the solids suspension to which the alkaline concentrate is fed, has a pH value of preferably 8–11, in particular 9–10.

The alkaline concentrate which is preferably in the form of an aqueous solution, contains the sodium hydroxide or other alkaline decomposing agents preferably in a concentration of 5 to 20 wt. %.

The alkaline concentrate is diluted with the liquid phase of the solids-liquids separation stage of the second section of the process line to form the aqueous decomposing agent. The dilution occurs preferably before the concentrate is added to the process line. If necessary, the concentrate and the liquid phase of the solids-liquids separation stage of the second section can also be added at different points between the first and the last solids-liquids separation stage of the first section of the process line.

If an alkaline solution is used, the concentration of the alkaline solution in the decomposing agent after the dilution with the liquid phase of the solids-liquids separation stage of the second section of the process line is preferably less than 10 millimole/l, in particular about 6 millimole/l.

Since the concentration of the proteins in the solids phase decreases from one solids-liquids separation stage to the next solids-liquids separation stage in the first section, there is provided before the last solids-liquids separation stage of the first section of the process line a reaction container for extracting the proteins residues from the solids phase. The reaction container receives the suspension which is formed from the solids phase separated in the next to the last solids-liquids separation stage of the first section. As mentioned above, this suspension is also preferably mixed from the fresh decomposing agent formed from the alkaline concentrate and from the liquid phase of the solids-liquids separation stage of the second section of the process line. The suspension remains in the reaction container preferably for 10 to 60 minutes.

The solids-liquids separation stages of the first section and the solids-liquids separation stage(s) of the second section of the process line can be constructed and combined in an arbitrary fashion, for example in the form of screens, filters, screen centrifuges or sedimentation containers. Preferred solids-liquids separation stages, however, are centrifuge separators or hydrocyclones; the centrifuge separators are mostly decanters. A solids-liquids separation stage can also be formed by a set of hydrocyclones.

The pH value of the aqueous decomposing agent decreases from the container through which in the alkaline concentrate is fed to the process line, against the flow towards the pulp. Consequently, in the container in which the solids phase is suspended together with the alkaline concentrate and with the liquid phase separated by the starch in the second section of the process line, the pH value is preferably 9 to 10; in the container in which the solids phase separated in the preceding solids-liquids separation stage is suspended, for example 6 to 8; and in the container in which the legume flour is pulped, 5 to 7.5. The pH value in the reaction container is preferably 7.5 to 9.

The first section of the process line has preferably three solids-liquids separation stages; however, the first section can also include four or more, or only two solids-liquids separation stages.

With the process of the invention, the proteins in the liquid phase of the first solids-liquids separation stage of the first section of the process line are highly concentrated, contributing to the high protein yield of the process of the invention.

On the other hand, the high protein concentration causes the liquid phase in the first solids-liquids separation stage of the first section of the process line to be highly viscous, which makes it more difficult to separate the solids phase from the liquid phase. Starch and fibers are carried into the liquid phase, thereby contaminating the protein. Consequently, the viscosity of the liquid phase of the first solids-liquids separation stage of the first section of the process line should be at most 500 cP, preferably 20 to 200 cP.

From the main process line, an ancillary process line for separating the proteins branches off which receives the liquid phase of the first solids-liquids separation stage of the first section of the main process line. The proteins which are dissolved in the aqueous decomposing agent, are here coagulated through addition of an acid. The solubility of the proteins of legumes, in particular peas, has a minimum at a pH value between 3.5 and 5, in particular between 4.0 and 4.7, at a temperature of the solution between 30 and 90° C., in particular between 60 and 80° C.

During crystallization as well as during coagulation, large coagulated particles are formed if the coagulation process proceeds slowly. A coagulate formed of larger particles can be separated more easy from the liquid phase, thereby increasing the protein yield and reducing the costs associated with drying the proteins.

Therefore, preferably three containers, each provided with an inlet for feeding the acid, are used to coagulate the proteins. The three containers can be independently filled with the liquid phase, mixed with the acid and drained, respectively.

The time required to fill, hold, or drain, respectively, the three containers is preferably at least one hour, more preferably at least two hours. Preferably, the first container is initially only partially filled, for example half filled, with the protein-containing liquid phase of the first solids-liquids separation stage of the first section of the main process line. Subsequently, the acid is mixed in slowly together with the remaining constituents. The rate at which the acid is added, is preferably selected so that the desired pH value, for example between 4.3 and 4.4, for coagulating the proteins is reached when the container is full.

When the first container is full, the protein-containing liquid phase of the first solids-liquids separation stage of the first section of the process line is fed to the next container. In the full first container, the coagulate ripens for at least one hour, preferably for at least two hours. During this time, the temperature of the container is slowly raised, for example from 50° C. to 80° C. This provides sufficient time for emptying the first container, i.e. for processing the ripened coagulate.

The coagulate in the ancillary process line is fed to a solids-liquids separation stage for processing for the purpose of separating the coagulated proteins. The liquid phase which is separated in the solids-liquids separation stage, is preferably fed to a Sedicanter (registered German mark No. 2058639 of the company Flottweg GmbH) to separate the liquid phase into a heavy liquid phase and a light liquid phase. The light liquid phase separated by the Sedicanter (registered mark) contains the dissolved components of the legume flour which cannot be coagulated, and can be condensed. The solids phase separated in the solids-liquids separation stage is fed an protein dryer.

The solids phase which is suspended in water and was separated in the last solids-liquids separation stage of the first section of the main process line, is sequentially fed to preferably several, for example two, fine jet screens for separating the fibers from the starch.

The starch-containing liquid phases of the fine jet screens are fed to at least one solids-liquids separation stage, for example a decanter, to separate the starch as a solids phase which is subsequently dried in a starch dryer.

A portion of the liquid phase of the solids-liquids separation stage of the second section of the process line is preferably added to the solids phase of the first fine jet screen, while the solids phase is fed to the second fine jet screen. A portion of the liquid phase of the solids-liquids separation stage of the second section is thus used to screen the fibers which overburdens the solids-liquids separation stage of the second section with additional liquids. This excess load causes the solids-liquids separation stage of the second section of the process line to give up solid matter to the liquid phase. However, only that fraction of the solid matter which is most difficult to separate and which contains the finest fiber fraction which has not yet passed a screen, is given up to the liquid phase. This fraction is thus screened again so that finally even the finest fibers are retained.

The operating temperature throughout the main process line, beginning with the first solids-liquids separation stage, is preferably between 15 and 45° C., more preferably between 25 to 35° C.

With the process of the invention, the protein contents in the starch obtained as the end product can be reduced to 0.5%, preferably to only 0.25% or less. Simultaneously, the process of the invention provides a protein yield of 75% or more, relative to the nitrogen contents of the legume flour.

For each ton of legume flour, only about 1 kg of alkaline decomposing agent, for example soda lye, as solid matter is used and only about 4 $m^3$ water are consumed.

BRIEF DESCRIPTION OF THE DRAWING

In the following, there is described by way of example and with reference to a flow diagram an embodiment of the system for carrying out the process of the invention.

DETAILED DESCRIPTION OF PREFERRED EMBODIMENTS

The systems includes a process line in the form of a first section I with three decanters 6, 9 and 10 forming solids-liquids separation stages, and a second section II.

The pea flour E which is produced in a pulping and screening process (not shown), is then passed through two pulping containers 1 and 2, each of which is provided with stirrers.

The liquid phase of the second decanter 9 which forms an aqueous decomposing agent, is fed through a line 3 alternately to the pea flour in the pulping containers 1 and 2, respectively. After a predetermined pulping time, the pulped flour is fed from the respective container to 1 and 2 through a line 4 to a first buffer container 5 equipped with a stirrer. From the container 5, the pea flour is fed in a continuous flow to the first decanter 6. After the pulping process, the pea flour has a pH value between 5 and 7.5.

In the first decanter 6, a liquid protein phase is separated from a solids phase containing starch and fibers.

The liquid protein phase which not only contains the proteins, but all the other water-soluble constituents of the pea flour as well, is fed via the line 7 to an ancillary process line where the proteins are obtained through coagulation.

The solids phase which is separated in the first decanter 6 and contains starch and fibers, is fed into a second buffer container 8 in which the solids phase is mixed via line 16 with liquid phase separated by the third decanter 10. The solids suspension in the second buffer container has a pH value between 6 and 8.

The solids phase which is separated in the second decanter 9 and contains starch and fibers, is fed into a third buffer container 12 in which the solids phase is mixed with the aqueous alkaline decomposing agent formed by the liquid alkaline concentrate B, for example soda lye, which is diluted via the line 11a with liquid phase from the decanter 11 of the second section II of the process line. The solids phase suspended in the buffer container 12 reaches the reaction container 14 via the line 13 and remains in the reaction container 14 for a predetermined reaction time to dissolve the residual albumen. The pH value of the suspension in the third buffer container 12 is between 9 and 10, and in the reaction container 14 between 7.5 and 9.

The fully reacted suspension is fed from the reaction container via the line 15 to the third decanter 10. The liquid phase separated in this decanter is fed via the line 16 to the second buffer container 8. The solids phase which is separated in the third decanter 10 and contains starch and fibers, is fed into a fourth buffer container 17 where the solids phase is suspended by adding water via a line 18.

In the process of the invention, the alkaline concentrate B is mixed with the liquid phase of the solids-liquids separation stage of the second section II of the process line, i.e. of the decanter 11, to form the aqueous decomposing agent. The aqueous decomposing agent so formed is then fed to the first section I of the process line between the first and the last solids-liquids separation stage of the process line, i.e. between the second decanter 9 and the third decanter 10.

The liquid phase separated in the respective subsequent solids-liquids separation stage of the first section I, i.e. the third decanter 10 or the second decanter 9, respectively, is fed back against the flow via the line 16 and 3, respectively, for the purpose of suspending the solids phase which is fed to the respective preceding solids-liquids separation stage, i.e. to the second decanter 9 and the first decanter 6, respectively. The suspended solids phase which is fed to the first decanter 6, is here formed by the pea flour E.

In a fourth buffer container 17, the solids phase from the third decanter 10 which contains starch and fibers, is suspended in water. The suspension in the fourth buffer container 17 has a pH value between 7 and 8.5.

To separate the fibers from the starch, the suspension from the fourth buffer container 17 is fed via the line 11b to a first fine jet screen 19. The solids phase of the first fine jet screen 19 which is drawn off via the line 20 and which consists mostly of the fibers, is suspended via the line 20a with a portion of the liquid phase of the decanter 11 of the second section II and then fed to a second fine jet screen 21 to remove residual starch from the fibers. The solids phase of the second fine jet screen 21 which is drawn off via the line 21b, forms the fiber fraction.

The wash jets of the second fine jet screen 21 are supplied via a line 18a with fresh water from line 18. The screen underflow of the second fine jet screen 21 is fed to the wash jets of the first fine jet screen 19 via a line 11c, supplying the wash water for the first fine jet screen 19.

The screen underflow of the first fine jet screen 19 which is this drawn off via the line 19a, contains almost the entire washable starch. This screen underflow is screened again with a shaking screen or a flat screen 22 to separate all fibers from the starch suspension. The screen 22 represents therefore a sort of safety device in situations where screening by the fine jet screens 19 and 21 is poor. This screen underflow of screen 22, i.e. the fibers, is drawn off via line 22b and combined with the fiber fraction drawn off via the line 21b.

The fiber-free starch suspension, after separation with the screen 22, is fed to the decanter 11 via the line 22a. In the decanter 11, the starch is separated as a solids phase which—after drying in a starch dryer 30—represents the principal products of the process of the invention.

Any protein residues fed to the decanter 11 are fed back as liquid phase from the decanter 11 against the flow via the line 11a to the buffer container 12 of the first section I of the process line.

Since a portion of the liquid phase of the decanter 11 is used for screening the fibers, the decanter 11 is actually overburdened with liquid. In this case, however, this is advantageous since the finest fiber fraction passing the screens 22 is fed again to the screens 19, 21 and 22.

The liquid phase which is separated in the first solids-liquids separation stage of the first section I, i.e. the first decanter 6, via the line 7, contains almost all protein constituents of the pea flour in dissolved form.

The proteins dissolved in the liquid phase are separated through coagulation.

For this purpose, three containers 23, 24 and 25 are provided which are filled alternately with the protein-containing alkaline liquid phase in line 7. An acid, for example sulfuric acid, can be fed via a line 7a to the three containers 23, 24 and 25 which are adapted to be heated.

For example, initially the first container 23 is filled partially via the line 7 with the alkaline protein solution. Subsequently, the container 23 is filled more, while simultaneously acid is added to the container 23 via the line 7a at such a rate that the final pH value of, for example, between 4.3 and 4.4 is reached when the container 23 is full. The next container, for example the container 24, is then filled with the alkaline protein solution via the line 7.

The full first container 23 is meanwhile heated within a predetermined time of, for example 2 hours, from a temperature between, for example, 55 to 65° C. to a temperature between 70 and 80° C., so that the coagulate in the container 23 can ripen. After the coagulate has ripened, the container 23 is emptied via the line 26 so that the coagulate can be further processed within the predetermined time.

The coagulate is then fed a solids-liquids separation stage, for example a decanter 27. The solids phase separated by the decanter 27 which contains the major portion of proteins and albumen, respectively, is fed to a protein dryer 29. The liquid phase of the solids-liquids separation stage and of the decanter 27, respectively, is fed via a line 27b to a Sedicanter 28 (registered German mark No. 2058639 of the company Flottweg GmbH) which separates the liquid phase into a phase with a higher density and viscosity and into a phase with a lower density and viscosity.

The phase with the higher density separated in the Sedicanter 28 (registered trademark) still contains proteins. This phase, together with the solid protein phase which is separated in the decanter 27, is fed via a conveyor belt 28a to the protein dryer 29.

The process water separated via a the line 28b can be, for example, concentrated in a concentration plant or used as animal food.

What is claimed is:

1. A process for obtaining starch and proteins from the flour of legumes, comprising the steps of:

producing a pulp by mixing legume flour with an aqueous decomposition agent;

introducing the pulp to a process line comprised of a first section having in succession a plurality of solids-liquids separation stages for separating a liquid phase from a solids phase in each of the solids-liquids separation stages, with the liquid phase from a first one of the solids-liquids separation stages containing protein and with the solids phase from each of the solids-liquids separation stages containing starch and fibers;

withdrawing the protein-containing liquid phase of the first solids-liquids separation stage from the process line for obtaining proteins;

returning the liquid phase from each of the solids-liquids separation stages following the first solids-liquids separation stage in counterflow direction for suspending the solids phase in the liquid phase before entering the solids-liquids separation stage immediately preceding the solids-liquids separation stage;

suspending the solids phase from a last one of the separation stages of the first section in water and conducting the suspension to a second section of the process line, with the second section having at least one separation stage for separating fibers from starch, and at least one solids-liquid separation stage for separating from the starch a liquid phase which forms together with an alkaline concentrate the aqueous decomposition agent; and feeding the alkaline concentrate and the liquid phase produced by the solids-liquids separation stage of the second section into the process line in a region between the first solids-liquids separation stage of the first section and the last solids-liquids separation stage of the first section.

2. The process of claim 1 wherein the legume flour fed to the process line is pulped successively in a plurality of consecutive containers.

3. The process of claim 1 wherein the producing step is effected at a ratio of 2 to 4 parts by weight of aqueous decomposing agent for each part by weight of legume flour.

4. The process of claim 1 wherein the alkaline concentrate is fed to the process line between the last solids-liquids separation stage of the first section and a penultimate solids-liquids separation stage which precedes the last solids-liquids separation stage.

5. The process of claim 4 wherein the aqueous decomposing agent fed into the process line between the penultimate solids-liquids separation stage and the last solids-liquids separation stage of the first section has a pH value between 8 and 11.

6. The process of claim 1, wherein the alkaline concentrate is soda lye.

7. The process of claim 6 wherein the concentration of the soda lye in the aqueous decomposing agent between the penultimate solids-liquids separation stage and the last solids-liquids separation stage of the first section is less than 10 mmole/liter.

8. The process of claim 1 wherein the liquid phase separated from the starch in the second section of the process line is fed to the first section between the last solids-liquids separation stage and a penultimate solids-liquids separation stage which precedes the last solids-liquids separation stage.

9. The process of claim 1 wherein the solids phase exiting a penultimate solids-liquids separation stage which precedes the last solids-liquids separation stage of the first section, and suspended in the liquid phase returned from the last solids-liquids separation stage is fed to a reaction container for prolonging a reaction time, before the solids phase is fed to the last solids-liquids separation stage of the first section.

10. The process of claim 1 wherein the protein containing liquid phase of the first section has a viscosity not exceeding 500 cP.

11. The process of claim 1, and further comprising the step of coagulating the proteins from the liquid phase of the first solids-liquids separation stage of the first section.

12. The process of claim 11 wherein said coagulating step includes adding an acid to the liquid phase.

13. The process of claim 12 wherein the liquid phase is acidified with acid to attain a pH value in the range between 3.5 and 5.

14. The process of claim 12 wherein said coagulating step is realized in at least one container for receiving the protein-containing liquid phase from the first solids-liquids separation stage, with the acid for acidifying the protein-containing liquid phase being so added to the container when the container is partially filled, as to effect a desired pH value in the range between 3.5 and 5 when the container is full.

15. The process of claim 14 wherein said coagulating step is carried out in at least three containers, which are so suited to one another that while a first one of the containers is filled with the protein-containing liquid phase and acidified to effect coagulation, proteins coagulated in a second one of the containers are left in place to let the coagulate ripen and coagulated proteins in a third one of the containers is being emptied.

16. The process of claim 11 wherein said coagulating step includes heating the liquid phase.

17. The process of claim 11, and further comprising the step of introducing coagulated proteins into at least one additional solids-liquids separation stage for separating the coagulated proteins from a liquid phase.

18. The process of claim 17, and further comprising the step of feeding the liquid phase of the additional solids-liquids separation stage to a stage which separates said liquid phase into a phase with a higher density and a phase with a lower density for separating uncoagulated proteins with a separated denser phase.

19. An arrangement for obtaining starch and proteins from legume flour, comprising:

a mashing device for pulping the legume flour with an aqueous decomposing agent;

a process line receiving pulp from the pulper, said process line being formed by a first section including a plurality of successive solids-liquids separation stages for separating a liquid phase from a solids phase in each of the solids-liquids separation stages, with the liquid phase from a first one of the solids-liquids separation stages containing proteins and with the solids phase from each of the solids-liquids separation stages containing starch and fibers, and a plurality of containers for receiving and suspension of the solids phase of the solids-liquids separation stages, whereby the containers and the solids-liquids separation stages are placed into one-to-one correspondence, with the container of a last one of the solids-liquids separation stages having suspended therein the solid phase of the solids-liquids separation stage in water;

a second section including at least one separation stage for separating fibers from the starch, and at least one solids-liquids separation stage for separating the starch from a liquid phase;

a first conduit for feeding an alkaline concentrate to the first section;

a second conduit for conducting the liquid phase separated from starch in the second section to the first section in a region between the first solids-liquids separation stage and the last one of the solids-liquids separation stages of the first section;

passageway means for returning the liquid phase from each of the solids-liquids separation stages following the first solids-liquids separation stage into the containers associated to the solids-liquids separation stages following the first solids-liquids separation stage for suspending the solids phase before entering the solids-liquids separation stage immediately preceding the solids-liquids separation stage; and a third conduit fluidly connected to the first solids-liquids separation stage for withdrawing the protein-containing liquid phase from the first solids-liquids separation stage.

20. The arrangement of claim 19 wherein the passageway means includes a conduit for returning the liquid phase separated in a solids-liquids separation stage, which follows the first solids-liquids separation stage, to the mashing device.

21. The arrangement of claim 20, and further comprising a buffer container disposed between the mashing device and the first solids-liquids separation stage of the first section.

22. The arrangement of claim 20 wherein the mashing device comprises a plurality of containers which are so adapted that each of the containers is capable of being separately filled and emptied with legume flour and aqueous decomposing agent.

23. The arrangement of claim 19 wherein the first conduit for feeding the alkaline concentrate and the second conduit for feeding the liquid phase which is separated in the second section, extend to the container for suspending the solids phase of a penultimate solids-liquids separation stage which precedes the last solids-liquids separation stage of the first section.

24. The arrangement of claim 23, and further comprising a reaction container positioned between the container for suspending the solids phase of the penultimate solids-liquids separation stage and the last solids-liquids separation stage of the first section.

25. The arrangement of claim 19 wherein the solids-liquids separation stages of the first section and the solids-liquids separation stage of the second section are formed at least in part by at least one device selected from the group consisting of centrifuge separator and hydrocyclone.

26. The arrangement of claim 25 wherein the centrifuge separator is formed at least in part by a decanter.

27. The arrangement of claim 19, and further comprising a coagulation device for coagulating the proteins, said third conduit being connected to the coagulation device.

28. The arrangement of claim 27 wherein the coagulation device comprises at least three containers and a second passageway means for feeding an acid into in each of the containers to coagulate the proteins therein, each of the containers being capable of being individually filled with the liquid phase of the first solids-liquids separation stage of the first section acidified with the acid, and individually emptied.

29. The arrangement of claim 28, and further comprising at least one additional solids-liquids separation stage positioned downstream of the containers of the coagulation device for separating the coagulated proteins.

30. The arrangement of claim 29, and further comprising a stage for separating the liquid phase of the additional solids-liquids separation stage into a phase of higher density and a phase of lower density.

31. The arrangement of claim 19 wherein the separation stage for separating the fibers from the starch in the second section is formed by a fine jet screen.

32. System according to claim 31, and further comprising a screen positioned downstream of the fine jet screen for receiving the liquid phase separated by the jet screen.

* * * * *